United States Patent [19]

Gardner

[11] Patent Number: 4,671,315

[45] Date of Patent: Jun. 9, 1987

[54] PORTABLE BRUSHFIRE HYDRANT

[76] Inventor: Thomas L. Gardner, 1818 Mt. Diablo Blvd., Walnut Creek, Calif. 94596

[21] Appl. No.: 857,085

[22] Filed: Apr. 29, 1986

[51] Int. Cl.[4] .......................... F16L 3/00; B65H 75/38

[52] U.S. Cl. .......................... 137/355.12; 137/355.17; 137/355.28; 242/86; 242/86.2; 242/86.5 R; 169/52; 239/745

[58] Field of Search ....................... 137/355.12, 355.17, 137/355.28, 899.3, 899.4, 236.1, 357, 565; 242/86, 86.2, 86.5 R; 248/79, 80; 169/24, 52; 239/744, 745

[56] References Cited

U.S. PATENT DOCUMENTS

| | | | |
|---|---|---|---|
| 357,900 | 2/1887 | Boyle | 137/355.28 |
| 745,351 | 12/1903 | Hungerford | 137/236.1 |
| 1,479,447 | 1/1924 | Beattie | 137/355.12 |
| 2,313,423 | 3/1943 | Dodd | 242/86 |
| 2,515,770 | 7/1950 | Grönberg | 137/236.1 |
| 2,918,975 | 12/1959 | Conery et al. | 242/86.2 |
| 3,171,430 | 3/1965 | Lovell et al. | 137/355.12 |
| 4,238,074 | 12/1980 | Coons | 137/355.12 |

*Primary Examiner*—A. Michael Chambers
*Attorney, Agent, or Firm*—Ralph E. Walters

[57] ABSTRACT

The present invention relates to brushfire fighting equipment and more particularly to a portable brushfire hydrant which can be easily stored and maintained in a condition for immediate use by an individual homeowner to protect his life and property from brushfire damage. In the past, individual home- owners could only utilize the commonly available garden hose which, of course, is grossly inadequate for the purpose or if a self-contained engine driven auxillary pump is available, it is usually not maintained or stored with all the accessory equipment necessary for the immediate and effective use in such fire fighting emergencies. The present invention successfully overcomes these deficiencies by providing a completely portable brushfire hydrant which has an open frame on which a high pressure pump can be securely mounted with all the accessories necessary conveniently disposed in a tightly compact storage condition on the frame for connection to and immediate use with the pump on a moment's notice.

5 Claims, 5 Drawing Figures

PORTABLE BRUSHFIRE HYDRANT

DESCRIPTION

1. Technical Field

The present invention generally relates to brushfire fighting equipment and more particularly to such an apparatus which can be easily stored and maintained in a condition for immediate use by an individual homeowner to protect his life and property from brushfire damage.

2. Background Art

In the western and southern areas of the United States and other similar locations throughout the world, brushfires constitute a substantial hazzard to persons and property. Each year during the hot, dry brushfire season millions of dollars of property is destroyed with the greatest monetary losses occurring from the destruction of housing and other structures in the more densely populated urban areas. The local fire departments are usually primarily concerned with the main body of such brushfires and do not have the manpower or the time to pay much attention to individual homes in the vicinity of the fire. Not only those homes and buildings in the direct path of the fire are in jeopardy but also any structures within a several mile radius may be subject to spark showers and roof ignition, particularly if the wind is blowing in an unfavorable direction.

At the present time about all an individual home owner can do is to use a common garden hose to try and keep his roof and surrounding territory damp enough to resist ignition by such drifting sparks and the like. The garden hose is, of course, grossly inadequate for this purpose. In addition, the local water company, and its more remote pumping stations may become disabled in a very serious or widespread fire situtation, to the extent that service may be completely interrupted to the consumers. Accordingly, the individual homeowner is very much on his own and must resort to some type of self-help if he or his property are to survive. Even if he might have access to a swimming pool, pond, lake, or other source of available water and also can find a self-contained engine driven auxillary pump, it is usually not maintained or stored with all the accessory equipment necessary for immediate and effective use in these types of emergencies. Such equipment, if available at all, is normally only kept for swimming pool maintenance, which does not require the same accessories that would be necessary for any effective use as a firefighting system.

It is therefore recognized that it would be highly desirable to provide an apparatus specifically constructed as a brushfire hydrant which can be stored in a compact, ready alert condition incorporating all the accessories and components necessary to effectively protect the homeowner's life and property against any approaching or eminently proximate brushfire at a moments notice. Accordingly, the present invention is directed to overcoming the problems as set forth above.

DISCLOSURE OF THE INVENTION

In accordance with one aspect of the present invention, there is provided a portable brushfire hydrant which utilizes an elongated wheelable open frame mounting an engine driven fluid pump having inlet and outlet connections thereon accessible through the frame with a plurality of hose members being releasably connectable to the pump connections and selectively mountable on the frame in compact coiled storage positions for convenient uncoiling and immediate use with the pump in an emergency situation.

In accordance with another aspect of the present invention the open frame includes a pair of upper rails spaced a predetermined distance apart to provide between them a hose receiving compartment and there is at least one fluid conveying hose which is coilable in a circular configuration to a predetermined diameter with the hose being deformable in an elliptical shape and convenient entry into the hose compartment of the frame and automatically expandable against the upper rails in tightly wedging relation.

In accordance with yet another aspect of the present invention, the open frame has a plurality of brackets mounted on the rearward end thereof defining a slotted compartment for receiving a second hose mounting member for coilably receiving a fluid conveying hose therein with the mounting member having a rotatable handle for manually inserting and removing the hose mounting member from the frame in rotatable supporting relation for the rapid removal of the hose from the mounting member when removed from the frame.

BEST OF MODE FOR CARRYING OUT THE INVENTION

Figure 1:
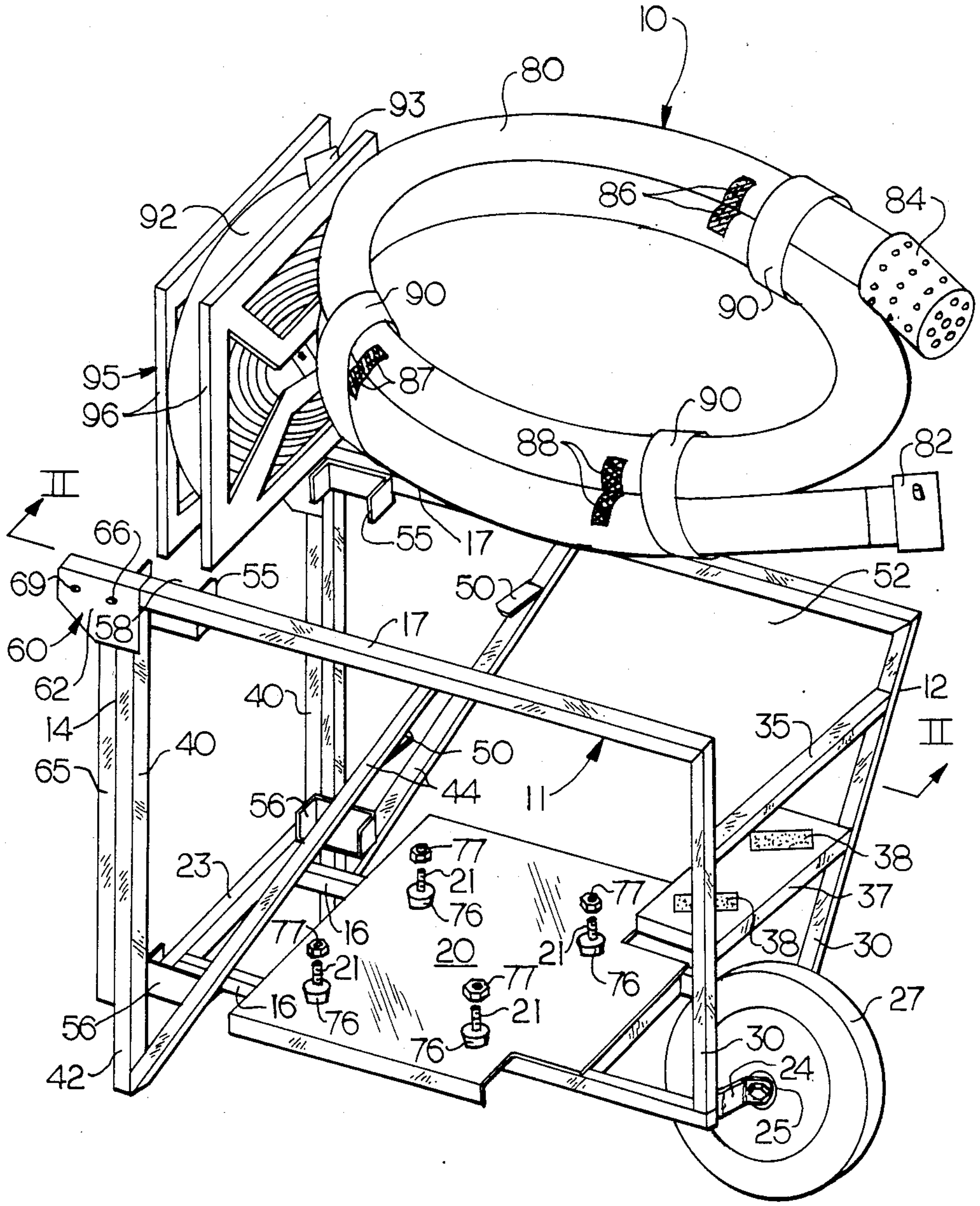
FIG. 1 is a three-dimensional view of the portable brushfire hydrant of the present·invention showing an open frame with the handles thereof in a downwardly compact stored position and fluid conveying hoses exploded upwardly in a position removed from the frame.
Figure 2:
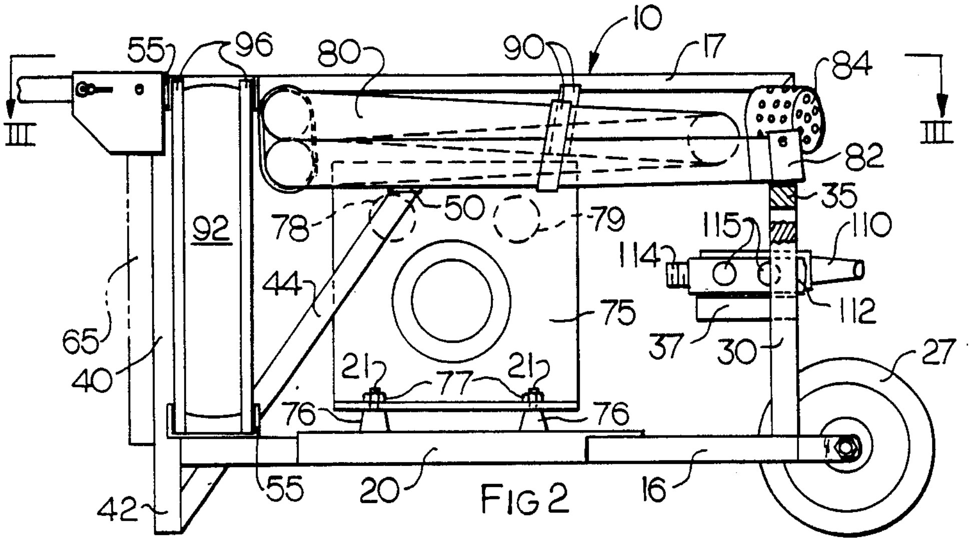
FIG. 2 is a vertical section taken along the line II—II of FIG. 1 of the portable brushfire hydrant showing the hoses disposed in a compact stored position on the frame.
Figure 3:
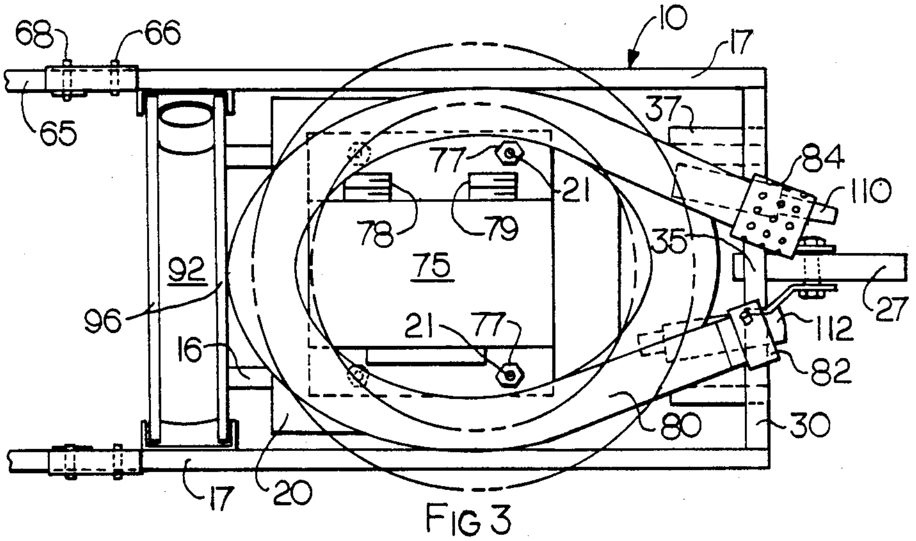
FIG. 3 is a top plan view of the frame showing an inlet hose in its elliptically deformed full line position on the frame and its prior expanded position of FIG. 1 shown in phantom lines.

Referring more particularly to FIGS. 1, 2 and 3 of the drawings, a portable brushfire hydrant 10 embodying the principles of the present invention provides an open frame 11 having predetermined front and rearward ends 12 and 14. The frame is constructed of a plurality of elongated hollow rigid metallic tubes, including a pair of spaced substantially parallel lower rails 16 and a pair of elevationly spaced upper rails 17. The upper rails are disposed in substantially parallel spaced relation from each other in a lateral direction and are substantially more widely spaced than the lower rails. A lower platform 20 is mounted on and rigidly secured to the upper surface of the lower rails 16 as by welding or the like and provides a plurality of upwardly extending engine and pump mounting studs 21 arranged in a substantially rectangular pattern. At the rearward end of the frame 11 there is provided a lower cross rail 23 interconnecting the lower rails 16. A pair of wheel mounting brackets 24 are inwardly extended from the lower rails at the front end 12 of the frame between which is extended an axle 25. A ground engaging wheel 27 is rotatably journalled on the axle and positioned substantially midway between the lower rails 16 substantially along the longitudinal axis of the frame 11.

The frame 11 further includes a pair of substantially upstanding front legs 30 individually rigidly connected to the forward ends of the upper and lower rails 17 and 16, respectively, which diverge from each other from their lower ends on the lower rails upwardly to the more widely spaced upper rails 17. A front strut 35 is disposed in substantially horizontal bridging relation between the front legs in somewhat downwardly spaced relation from the upper rails. A front accessory mounting shelf 37 is also disposed in bridging relation between the front legs 30 in substantially horizontal downwardly spaced relation from the front strut 35. A plurality of accessory mounting strips 38 such as that sold under the trademark VELCRO are secured to the upper and lower surfaces of the front shelf by a suitable adhesive material or the like. A pair of substantially upright rear legs 40 are rigidly connected as by welding or the like to the rearward ends of the upper rails 17 and to the opposite ends of the lower cross rail 23 and provide downwardly extending foot portions 42 extending below the lower rails 17. A pair of diagonal reenforcing side struts 44 are rigidly connected to the foot portions 42 and are upwardly forwardly extended therefrom and secured to the upper rails 17 at a point substantially midway between the front and rearward ends 12 and 14, respectively, of the frame. It will be apparent that with the two foot portions 42 and the front wheel 27 there is provided a stable three point support for the frame maintaining the upper and lower rails in substantially spaced parallel relation to the ground.

A pair of hose supporting tabs 50 are individually secured to the inner surfaces of the diagonal side struts 44 in spaced inwardly extended relation therefrom into the frame which lie in substantially coplanar horizontal relation with the front strut 35. The front strut and tabs provide a three point hose receiving support compartment 52 adjacent to the forward end 12 of the frame. A pair of sets of u-shaped upper and lower hose reel receiving brackets 55 and 56 respectively, are mounted in inwardly extending relation at the rearward end 14 of the frame. The upper brackets 55 are secured to the inner surfaces of the upper rails 16 and the lower brackets 56 are disposed in bridging relation between the rear legs 40 and their respectively associated angular side struts 44 in somewhat upwardly spaced relation from the lower rails 16. A substantially square reel receiving slot 58 is thereby formed between the sets of upper and lower brackets 55 ad 56 in upwardly opening relation on the frame. A pair of handle supporting brackets 60 are individually secured to their respective rearward legs 40 and associated upper rails 17 and include downwardly extending outer flanges 62. A pair of operator gripping and control handles 65 are pivotally mounted to their respective flanges of the mounting brackets by a pivot pin 66 and are normally held in a rearwardly extending horizontal position by a lockpin 68 extended through a pin receiving hole 69 in the brackets 60.

An engine driven pump 75 is mounted on the platform 20 of the frame 11 on a plurality of anti-vibration resilient grommets 76 individually disposed about the mounting studs 21 by a plurality of screw threaded nuts 77. The pump has a low pressure inlet connection 78 and a high pressure outlet connection 79. A low pressure inlet hose 80 of a predetermined length is provided with a connector end 82 and an opposite inlet or strainer end 84. A plurality of sets of color coded indicia strips or rings 86, 87, and 88 are disposed about the hose in predetermined spaced relation thereon so that when the hose is disposed in coiled circular configuration the similarly colored strips can be aligned to form the coiled hose in a predetermined diameter. A plurality of securing straps 90 are then wound around the coiled hose to secure it in such predetermined diameter. A high pressure hose 92 is provided having opposite inlet and outlet ends 93 and 94, respectively.

Figure 5:
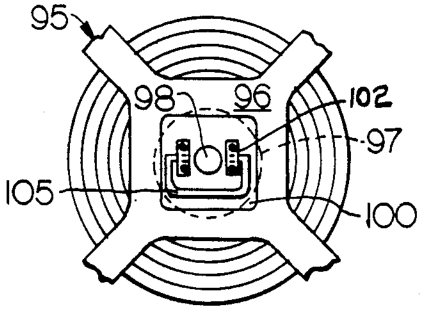
FIG. 5 is a fragmentary plan view of a high pressure hose mounting apparatus showing its manually grasping handle portion removed from the portable brushfire hydrant of the preceding Figs.

As best shown in FIGS. 1 and 5, a hose reel 95 for the hose 92 is provided having a pair of spaced side plates 96 which are mounted in spaced substantially parallel relation to each other on a circular drum or hub 97. The hub and reel are rotatably journalled on an elongated axle 98 extended therethrough which has a handle mounting plate 100 rigidly secured to the axle. A pair of brackets 102 pivotally mount a handle 105 which can be swung outwardly from its associated side plate 96 for grasping by an operator. A hose nozzle 110 and a multi-orifice flow divider valve 112 may be conveniently mounted by the mounting strips 38 on the front shelf 37 in position for immediate use. The valve has an inlet connector 114 which is connectable to the high pressure hose 92 and a plurality of outlet connections 115 for supplying a plurality of garden hoses or the like, not shown.

Figure 4:
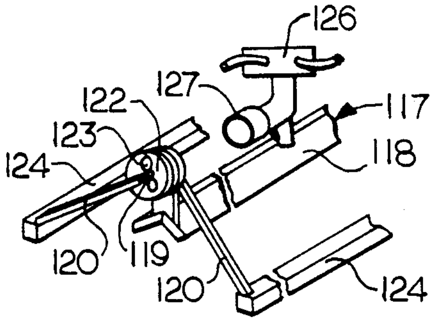
FIG. 4 is a three-dimensional fragmentary view of a rooftop sprinkler attachment for the portable brushfire hydrant.

As best shown in FIG. 4 an additional accessory for the brushfire hydrant of the present invention is a roof-top sprinkler generally indicated by the reference numeral 117. The roof-top sprinkler provides an elongated angle iron 118 adapted to be positioned along the upper ridge of a roof, not shown, which has at least one upstanding bracket secured thereto as by welding or the like. An elongated screw-threaded stud 119 is outwardly extended from the bracket for supporting a pair of oppositely extended outrigger legs 120. Each leg provides a disk mounting washer 122 slidably disposed on the stud and which is secured thereto as by a wing nut 123. A foot rail 124 is secured to the outer end of each of the legs 120 with the leg being swingably adjustable prior to tightening the wing nut to different angular positions for adjusting the outrigger legs to various roof angles. A sprinkler head 126 is releasably mounted on the angle iron 118 and has a hose connection 127 thereon for quick coupling with a conventional garden hose, not shown, extended from the valve 112.

Industrial Applicability

In operation, the portable brushfire hydrant 10 is normally stored in the position shown in FIG. 2 with all the accessories disposed in a compact stored condition ready for immediate use except that the handles 65 are disposed in their lowered phantom line position so that the hydrant occupies a minimum of storage space. Prior to the assembly of all the accessories on to the frame 11, the inlet hose 80 is coiled to the position shown in FIG. 1 with the several coded strips 86, 87 and 88 disposed in aligned relation to each other so as to form the hose in a circular configuration of the predetermined preferred diameter. The inlet hose is then laterally deformed from its phantom line position of FIG. 3 into the full-line elliptical shape and inserted into the receiving compartment 52 between the upper rails 17 in tightly wedging relation therebetween. The hose is then shoved further downwardly within the frame to rest upon the front strut 35 and the pair of supporting tabs 50.

The outlet hose 92 is wound upon the reel 95 with the inlet end 93 thereof being disposed in conveniently nesting relation within the upper corner of the reel. The handle 105 is swingable outwardly from it adjacent side plate 96 to be grasped by the operator and held in position to be slid downwardly between the brackets 55 and 56 on the frame 11. When fully inserted the reel rests upon the lower rails 16 in completely confined relation on the rearward end of the frame.

The portable brushfire hydrant 10 of the present invention may then be easily stored in a minimum of space within the owner's garage, implement shed or the like in a condition for immediate use. During storage a cover, not shown, may be placed upon the upper rails 17 and may include locating blocks on the underside thereof precisely to fit between the upper rails and against the upper brackets 55 precisely to locate the cover in congruent relation and preclude any skewing thereof from its covering position on the frame. Such cover may be desirable in areas of the country subject to earthquakes where debris or other heavy objects might tend to fall upon the rigid frame 11 which is effective to protect all the essential accessories within the frame.

In an emergency the portable brushfire hydrant 10 of the present invention can be quickly and easily wheeled to an optimum location for immediate use. The handles 65 are first swung upwardly to their operating position shown in FIGS. 2 and 3 and the lockpins 68 installed to maintain them in their rearwardly extended operating positions. The portable hydrant can then be wheeled to a location adjacent to a source of water such as a swimming pool, lake, pond or the like and the accessories quickly removed from the frame for convenient installation. The inlet hose 80 is deformed inwardly sufficiently to release it from between the upper rails 17 of the frame and the connector end 82 thereof is connected to the inlet connection 78 on the pump 75. The restraining straps 90 are removed from the hose and its strainer end 84 is extended downwardly into the swimming pool or other source of water.

The high pressure outlet hose 92 is quickly and conveniently removed from the housing by grasping handle 105 and pulling upwardly to slide the hose reel 95 upwardly and outwardly from the frame 11. Upon such removal the outlet hose can then be quickly pulled off of the reel by repeated manipulations of the hose to rotate the reel about the handle and axle 98. Upon complete removal of the hose from the reel the inlet end 93 is connected to the outlet connection 79 of the pump and the nozzle 110 can be removed from its location on the shelf 37 of the frame and conveniently attached to the end of the outlet hose.

After starting the engine driven pump 75, a volume of high pressure water will be drawn from the source through the pump 75 and outwardly of the nozzle 110 for directing a high pressure stream of water to the fire area. Alternatively, the outlet hose 92 can be connected to the flow divider valve 112 after its removal from the frame, to which several garden hoses can be attached if there is a need to fight a brushfire over a broader area requiring a plurality of streams of water to be directed at different areas of the fire. Such valve 112 also provides the capability of utilizing one of the garden hoses for connection to the rooftop sprinkler 117 for simultaneously wetting the roof of the house on which the sprinkler is installed while concurrently fighting a brushfire on the ground surrounding the house. It should be understood that the rooftop sprinkler can be permanently installed on a particular roof in which case a hose would be permanently connected to the outlet 115 and extended with its opposite end positioned adjacent to the ground for ready access in an emergency. Alternatively, the rooftop sprinkler may be stored on the portable brushfire hydrant frame 11 and quickly and conveniently installed on the roof by loosening the wing nut 123 to permit adjustment of the legs 120 to cause the foot portions 124 thereof to engage the roof in supporting relation irrespective of the particular roof angle encountered. The wing nut can then be retightened to snugly hold the legs in their properly adjusted position conforming to the particular roof angle. After the brushfire or other related fires have been extinguished or brought under control, the hoses can be recoiled and quickly reinstalled on the frame 11 in their conveniently compact storage positions as previously described.

From the foregoing it is readily apparent that the structure of the present invention provides an improved portable brushfire hydrant which is specifically constructed for conveniently storing a high pressure pump and a wide variety of accessories and fire fighting components in a compact fully protected position on the wheelable frame but which can be conveniently removed and installed for immediate use with the pump on a moment's notice.

I claim:

1. A portable brushfire hydrant comprising an elongated wheelable open frame having spaced upper rails;

an engine driven fluid pump mounted on said frame and having low and high pressure inlet and outlet connections, respectively, accessible through the frame;

a coilable low pressure hose of a predetermined diametrical size receivable between said upper rails of the frame and being connectable to said inlet connection on said pump;

said frame including a pair of substantially upright wheel supporting front legs having upper ends individually rigidly secured to said upper rails in depending relation therefrom;

said frame further including a substantially horizontal front strut rigidly secured to the front legs in bridging relation therebetween;

and tab means disposed on the frame rearwardly of said front strut and lying in a common substantially horizontal plane therewith below said upper rails to provide a three-point support platform for said inlet hose between said upper rails of the frame.

2. The portable brushfire hydrant of claim 1 wherein a plurality of sets of similarly matched pairs of indicia are formed in predetermined spaced relation along the length of said inlet hose with said matched pairs being alignable during coiling of said hose precisely to attain said predetermined diametrical size.

3. A portable brushfire hydrant comprising an elongated open frame having front and rearward ends, and pairs of spaced substantially parallel upper and lower rails;

a pair of elongated handles pivotally mounted on said rearward end of the frame and being movable between an operating position individually rearwardly, longitudinally extended from said upper rails and a compact stored positon swung downwardly against said rearward end of the frame;

a lower pump support platform rigidly mounted on said lower rails intermediate said front and rearward ends of the frame;

a pair of substantially upright front legs having upper ends individually rigidly secured to said upper rails in depending relation therefrom and providing downwardly converging lower ends;

an axle mounted between said lower ends of the front legs;

a ground engaging wheel rotatably journalled on said axle;

said frame further including a pair of substantially upright rearward legs individually interconnecting said upper and lower rails and having lower ends extended below said lower rails to provide ground engaging support foot portions, and a pair of angular struts extending between their respectively associated foot portions upwardly to a point on said upper rails substantially midway said front and rearward ends of the frame;

a pair of tabs individually mounted on said angular struts in downwardly spaced relation from said upper rails;

a front strut rigidly secured to and extending in a substantially horizontal plane between said front legs and lying in a substantially common plane with said tabs;

a pair of upper inwardly extending u-shaped upper brackets individually mounted to said upper rails, and a pair of lower inwardly extending u-shaped brackets individually mounted between said rearward legs and their associated angular struts immediately above said lower rails and in vertically aligned relation with said pairs of upper brackets;

an engine driven fluid pump having low and high pressure inlet and outlet connections;

vibration isolation means releasably mounting said pump on said lower platform with the inlet and outlet connection being accessible through the frame;

a low pressure hose connectible to said inlet connection on the pump and being coilable in a circular configuration but deformable elliptically for entry between said upper rails for resting upon said tabs and said front strut;

a high pressure hose connectible to said outlet connection from the pump;

and a substantially square reel having a circular hub about which said high pressure hose is wound providing opposite side plates adapted to be slidably received between said upper and lower brackets to rest upon said lower rails at said rearward end of the frame.

4. The portable brushfire hydrant of claim 3, including an accessory storage shelf mounted on the frame between the front legs in substantially horizontal position downwardly spaced from the front strut and providing upper and lower surfaces;

and a plurality of accessory mounting strips secured in spaced relation to said upper and lower surfaces of the storage shelf.

5. The portable brushfire hydrant of claim 4, including a hose nozzle releasably mounted by one of said strips on the storage shelf;

a flow divider valve for selective connection to said outlet hose releasably mounted by another of said strips on the storage shelf and providing a plurality of outlet connections;

and a sprinkler head and adjustable roof top mounting apparatus therefor being selectively connectable to said outlet connections of said flow divider valve.

* * * * *